US012800472B2

(12) United States Patent
Shkolnikov et al.

(10) Patent No.: US 12,800,472 B2
(45) Date of Patent: Nov. 17, 2026

(54) PARTICLE DETECTION VIA RESONANT FREQUENCIES

(71) Applicant: Hewlett-Packard Development Company, L.P., Spring, TX (US)

(72) Inventors: Viktor Shkolnikov, Palo Alto, CA (US); Joshua M. Yu, Corvallis, OR (US); Matthew David Smith, Corvallis, OR (US); Roberto A. Pugliese, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 863 days.

(21) Appl. No.: 18/023,718

(22) PCT Filed: Sep. 9, 2020

(86) PCT No.: PCT/US2020/049858
§ 371 (c)(1),
(2) Date: Feb. 27, 2023

(87) PCT Pub. No.: WO2022/055480
PCT Pub. Date: Mar. 17, 2022

(65) Prior Publication Data
US 2023/0280262 A1 Sep. 7, 2023

(51) Int. Cl.
*G01N 15/14* (2024.01)
*G01N 15/1429* (2024.01)

(52) U.S. Cl.
CPC ..... *G01N 15/1484* (2013.01); *G01N 15/1429* (2013.01)

(58) Field of Classification Search
None
See application file for complete search history.

(56) References Cited

U.S. PATENT DOCUMENTS

| | | | | |
|---|---|---|---|---|
| 5,025,346 | A | 6/1991 | Tang et al. | |
| 8,522,604 | B2 | 9/2013 | Zhe et al. | |
| 10,024,819 | B2 | 7/2018 | Lo et al. | |
| 10,596,572 | B2 | 3/2020 | Hong et al. | |
| 2008/0110247 | A1 | 5/2008 | Shaw et al. | |
| 2013/0099798 | A1 * | 4/2013 | Birecki | G01N 27/07 324/649 |
| 2016/0334351 | A1 * | 11/2016 | Lu | G01N 27/06 |
| 2021/0322977 | A1 | 10/2021 | Sun | |

FOREIGN PATENT DOCUMENTS

| | | | |
|---|---|---|---|
| CN | 110227565 | A | 9/2019 |
| WO | 2011/021984 | A1 | 2/2011 |
| WO | 2018/073768 | A1 | 4/2018 |

* cited by examiner

*Primary Examiner* — Lore R Jarrett
(74) *Attorney, Agent, or Firm* — Foley & Lardner LLP

(57) ABSTRACT

In one example in accordance with the present disclosure, a particle detection system is described. The particle detection system includes a microfluidic channel through which fluid is to flow. The fluid includes particles. The particle detection system also includes a sensing circuit to output a resonant frequency. The sensing circuit includes a pair of electrodes disposed within the microfluidic channel. Contents of a volume between the pair of electrodes changes a capacitance between the pair of electrodes. A change in the capacitance changes the resonant frequency output by the sensing circuit. The particle detection system also includes a controller to determine the contents of the volume based on the resonant frequency.

15 Claims, 8 Drawing Sheets

PARTICLE DETECTION VIA RESONANT FREQUENCIES

CROSS-REFERENCE TO RELATED APPLICATIONS

This application is filed under 35 U.S.C. § 371 as a National Stage of PCT International Application No. PCT/US2020/049858, filed Sep. 9, 2020, which is incorporated by reference herein in its entirety.

BACKGROUND

Cellular biology is a field of biology that studies the structure, function, and operation of cells. An understanding of the structure, function, and operation of cells provides a wealth of information. For example, individual cells may be used to generate cell lines and to aide in the further understanding of mechanisms of cellular function. As another example, once the structure, function, and operation of cells is more fully understood, certain diseases may be prevented and treated.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
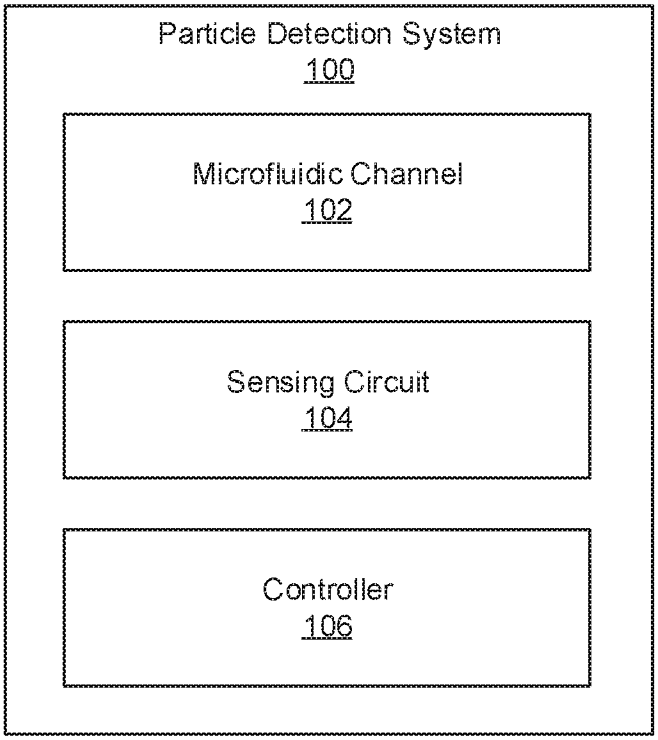
FIG. 1 is a block diagram of a system for detecting particles via a resonant frequency, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Cellular analytics is a field of biology that uses instruments to separate, identify, and quantify matter. A wealth of information can be collected from a cellular sample. A greater understanding of the different kinds of cells and their function can lead to certain technological innovations that benefit society in countless ways. For example, from cells, certain biologics such as proteins, insulin, other therapeutic drugs, RNA, and DNA may be obtained.

Accordingly, refinements to cellular processing may enhance the possible uses and reach of cellular analytics. For example, it may be desirable to start the fabrication of materials and therapeutics from a homogeneous cell population. One way to create a homogeneous cell population is to grow the population from a single cell. Such a cell population is referred to as a clonally-derived cell line or a monoclonal cell line. That is, a clonally-derived, or monoclonal, cell line refers to cells that are derived from a single cell with well-defined properties. To generate such clonally-derived cell lines or biologics from a cell line, a scientist should be confident that the cell line was derived from a single cell.

As a specific example, a scientist may desire to generate chimeric antigen receptor (CAR) T-cells in order to combat cancerous cells in a patient. CAR T-cell therapy changes a patient's T-cells in a way that attacks the cancerous cells. Accordingly, T-cells are processed and manipulated to form CAR T-cells. Were a starting population to include an unknown quantity of T-cells, the quantity and quality of produced CAR T-cells would be reduced and/or unknown, which could affect the efficacy of a session of the CAR T-cell therapy.

Other examples of cells that may be isolated include HeLa cells, MDA-MD-231 cells, jurkat cells, and MCF7 cells. While specific reference is made to particular cells that are singulated, the present specification may be used to detect and isolate any number of cells or particles.

Accordingly, by using a starting population for which the characteristics are verified, confidence and reliability in the subsequent operations is promoted. In other words, as can be imagined, uncertainty regarding the characteristics of a starting population introduces uncertainty and inaccuracy in an output and for any operation subsequently carried out, whether that operation be analysis to identify a particular relationship, cell generation, and/or biologic generation. Therefore, it may be desirable to separate single cells into growth chambers, and to verify that there was a single cell in the chamber, and not multiple cells as having multiple cells will likely increase the heterogeneity of the progeny population.

While some devices may perform cell sorting, such systems are ineffective for a number of reasons. For example, in some cases cells may be sorted by fluorescence activated cell sorting (FACS) and magnetically activated cell sorting (MACS), both of which rely on labels to identify the cells, a single cell at a time. However, the presence of such labels may interfere with cellular operation and analysis of cell functionalities. Accordingly, the present specification provides for such sorting and singulation without labeling agents, thus preserving the integrity of any subsequent operations.

Label-free singulation of cells may involve expensive systems that incorporate video detection integrated with dispensing, or dilution of the cell suspension, and portioning the suspension into individual volumes (wells). One specific example is using a limiting dilution. In a limiting dilution, a cell suspension is diluted such that the number density (i.e., the number of cells/the number of chambers) is low, such that that number of cells in a well follows a Poisson distribution. However, in limiting dilution, many of the wells may be wasted (increasing cost), while a number of the non-empty wells contain 2 or more cells. Moreover, a scientist may not know which wells are empty, which have multiple cells, and which have the desired single cell. This uncertainty in the initial sample of cells propagates to uncertainty regarding any analyzed output and may add heterogeneity into the resulting population.

In some examples, a cell solution is loaded into an ejection system and cells are ejected one at a time by observing the presence of a cell in a chamber upstream of a fluid ejector. While this may reduce the number of empty wells, cells may become stuck in the dispense orifice, accumulate there, and then several cells may be ejected into a single chamber, resulting in a non-homogenous population. That is, even though cells are positioned to be ejected one at a time, for any number of reasons more than one cell may be ejected, or no cells may be included in the portion of fluid ejected during an ejection event. Moreover, such systems may include expensive optical hardware.

Accordingly, the present specification describes a particle detection system that identifies cells based on an output resonant frequency. That is, the present system relies on measurement of occluded channel capacitance via a resonant circuit and a frequency counter. Relying on a measurement of a resonant frequency may be less sensitive to stray capacitances in the system (e.g. connections, fabrication uncertainties) and more sensitive to the capacitances of the cell occluding the microfluidic channel for cell detection. Accordingly, such a particle detection system may have a higher signal-to-noise ratio and may more effectively distinguish between single cells and clumps of cells. The particle detection system may also be used for sorting of cells based on their size and electrical properties. As described above, the effective isolation of particles into individual chambers as provided by the present specification, allows for the production of genetically pure populations of these cells. Also as described above, genetically pure populations are desirable for their role in the production of biologics or for basic biological study (e.g. single cell sequencing).

In an example, the particle detection system includes a microfluidic device, a sensing circuit, and a controller. In some examples, the particle detection system is part of a fluid ejection system that includes a reservoir for particles dispersed in fluid (e.g. cells), a channel leading from the reservoir, and an ejector such as a thermal inkjet (TIJ) resistor to dispense the fluid, including the particles. In this system, the TIJ resistor acts like a pump to draw the fluid from the reservoir. A pair of electrodes are disposed inside the microfluidic channel. These electrodes are part of the sensing circuit. The sensing circuit may also include an inductor, a switching element, a voltage supply, and a frequency counter. The electrodes together with the space between the electrodes create a variable capacitance element that is part of the sensing circuit. The presence and type of the particle changes this capacitance as a function of time. The change in the capacitance changes the resonance frequency of the sensing circuit. The switching element applies a wide range of frequencies to the sensing circuit and the sensing circuit resonates at an appropriate frequency. The resonant frequency is detected and the controller correlates the detected resonant frequency to a particular object (e.g. single cell vs. clump, or cell type). In some examples, the particle detection system may, in addition to detecting a particular type and quantity of cell, control the fluidic ejection. That is, when the resonant frequency identifies a target cell, the controller may position a multi-chamber tray under the nozzle to dispense this object.

Specifically, the present specification describes a particle detection system. The particle detection system includes a microfluidic channel through which fluid is to flow, the fluid including particles to be ejected. The particle detection system also includes a sensing circuit to output a resonant frequency. The sensing circuit includes a pair of electrodes disposed within the microfluidic channel. The contents of a volume between the pair of electrodes changes a capacitance between the pair of electrodes. A change in the capacitance changes the resonant frequency output by the sensing circuit. The particle detection system also includes a controller to determine the contents of the volume based on the resonant frequency.

In an example, the particle detection system includes a database to map resonant frequencies to contents of the volume. In an example with a database, the controller may convert the resonant frequency output by the sensing circuit to a capacitance. In this example, the database maps the capacitance to contents of the volume.

In an example, the particle detection system includes a comparator to convert the resonant frequency output by the sensing circuit to a step function. In some examples, the pair of electrodes are disposed inside of a constriction along the microfluidic channel. In other examples, the pair of electrodes are disposed outside of the constriction along the microfluidic channel. As described above, in some examples, the fluid is drawn through the microfluidic channel via an inkjet ejector.

Turning to the sensing circuit, in some examples, the sensing circuit includes an inductor outside the microfluidic channel and a switch to introduce multiple frequencies into the sensing circuit.

The present specification also describes a method. According to the method, multiple frequencies are introduced into a sensing circuit. Specifically, a pair of electrodes are disposed within the microfluidic channel and a fluid with particles disposed therein flows between the pair of electrodes. A resonant frequency of the sensing circuit is identified, wherein the resonant frequency is defined in part by the capacitance of a volume between the pair of electrodes. The contents of the volume are determined based on an identified resonant frequency. In an example, introducing multiple frequencies includes closing a switch to couple a voltage source to the sensing circuit.

In an example, the method includes converting the resonant frequency into a step function and counting a number of steps. Determining the contents of the volume may include determining a quantity of particles within the volume and determining a type of particle within the volume.

In another example, the present specification describes a particle detection system that includes a microfluidic channel through which fluid is to flow, wherein the fluid includes particles and a sensing circuit to output a resonant frequency. In this example, the sensing circuit includes 1) a pair of electrodes disposed within the microfluidic channel, 2) a voltage source to apply a voltage through the sensing circuit, 3) a switch to drive multiple frequencies of the voltage into the sensing circuit, 4) an inductor, and 5) a frequency counter to determine the resonant frequency of the sensing circuit. In this example, contents of a volume between the pair of electrodes changes a capacitance between the pair of electrodes and a change in the capacitance changes the resonant frequency output by the sensing circuit. The particle detection system also includes a controller to determine the contents of the volume based on the resonant frequency.

In an example, the controller, responsive to an output of the sensing circuit, controls a fluid ejection system of which the particle detection system is a component.

Note that while the present specification describes cells as a particular type of target particle, the present systems and methods may target and eject other types of particles including beads of various materials such as metal and latex, DNA-functionalized beads, and other microspheres. That is, while target particles may be of a wide-variety of types, in one specific examples, the particles are cells.

Note that throughout the specification, while specific reference is made to deposition of fluid into wells of a well-plate, the present systems and devices can be used to deposit fluid on other target surfaces such as microscope slides, matrix assisted laser desorption/ionization (MALDI) plates, petri dishes, and microfluidic chips among other substrates or surfaces. In the later examples, the substrate may include a fixture that fits into the corner ribs and the clamp and retains the target surface.

In summary, using such a particle detection system 1) provides highly accurate cell separation; 2) is low cost; 3) provides for the rapid generation of many singulated cells; 4) avoids additional labeling reagents; 5) avoids separate verification tools/operations; 6) is less sensitive to stray capacitances in the system; and 7) has a good signal-to-noise ratio. However, the devices disclosed herein may address other matters and deficiencies in a number of technical areas.

As used in the present specification and in the appended claims, the term "fluidic die" refers to a component of a fluid system that includes components for storing, moving, and/or ejecting fluid. A fluidic die includes fluidic ejection dies and non-ejecting fluidic dies.

Further, as used in the present specification and in the appended claims, the term "a number of" or similar language is meant to be understood broadly as any positive number including 1 to infinity.

Turning now to the figures, FIG. 1 is a block diagram of a system (100) for detecting particles via a resonant frequency, according to an example of the principles described herein. In some examples, the particle dispensing system (100) may be a microfluidic structure. In other words, the components, i.e., the channel (102) and components of the sensing circuit (104) such as the electrodes may be microfluidic structures. A microfluidic structure is a structure of sufficiently small size (e.g., of nanometer sized scale, micrometer sized scale, millimeter sized scale, etc.) to facilitate conveyance of small volumes of fluid (e.g., picoliter scale, nanoliter scale, microliter scale, milliliter scale, etc.).

The particle detection system (100) may be used to detect particles of a variety of types. For example, the particle detection system (100) may be implemented in a life science application. Accordingly, a biological fluid may be analyzed and/or passed by the particle detection system (100). As a specific example, the particle detection system (100) may be used to count cells in a particular sample fluid. In a specific example, the particle detection system (100) is a part of a larger fluid ejection system. For example, the fluid ejection system may be implemented in a laboratory and may eject biological fluid. The fluid dispensed by the fluid ejection system may be of a variety of types and may be used for a variety of applications. In some examples, the biological fluid may include solvent or aqueous-based pharmaceutical compounds, as well as aqueous-based biomolecules including proteins, enzymes, lipids, antibiotics, mastermix, primer, DNA samples, cells, or blood components, all with or without additives, such as surfactants or glycerol. To eject the fluid, the controller (106) passes control signals and routes them to fluid ejectors of the fluid ejection system.

The particle detection system (100) includes a microfluidic channel (102) through which fluid is to flow. The fluid may include particles that are to be separated. For example, the fluid may be a solution that includes deoxyribonucleic acid (DNA) or ribonucleic acid (RNA). A scientist may desire to separate the DNA or RNA from the fluid such that the DNA or RNA may be extracted, studied, processed, or otherwise acted upon. In such a system, particles may be introduced into the solution. These particles may be detected and ejected and the nucleic acid may be concentrated and separated from the particles. As one specific example, a polymerase chain reaction (PCR) is an operation wherein millions or billions of copies of a specific DNA sample are replicated. However, prior to PCR, the DNA in a given sample may be separated and concentrated via the particle detection system (100) and the larger fluid ejection system to enhance PCR efficacy.

In some examples, the fluid flow through the microfluidic channel (102) may be generated by a pump that is disposed upstream or downstream from the particle-capturing region of the microfluidic channel (102). In some examples, the pump may be an integrated pump, meaning the pump is integrated into a wall of the microfluidic channel (102). In some examples, the pump may be an inertial pump which refers to a pump which is in an asymmetric position within the microfluidic channel (102). In some examples, the pump may be a thermal inkjet resistor, or a piezo-drive membrane or any other displacement device.

The particle detection system (100) may also include a sensing circuit (104) to output a resonant frequency. Specifically, the sensing circuit (104) may be referred to as an LC circuit or resonant circuit which acts as a resonator. In operation, energy in the circuit is shifted between the capacitor and the inductor to create energy oscillations. That is, when an inductor is connected to a charged capacitor, voltage across the capacitor drives current through the inductor to build up a magnetic field therein. As the voltage in the capacitor drops, the energy stored in the inductor magnetic field induces a voltage. This induced voltage causes a current to recharge the capacitor. This results in energy oscillations. The resonant frequency of these oscillations is dependent upon the inductance of the inductor and the capacitance of the capacitor and may be detected by a controller (106). The present particle detection system (100) may include a switch or frequency generator to apply the charge to initiate the resonating of the sensing circuit (104).

Accordingly, the sensing circuit (104) may include a capacitive element and an inductive element. The capacitive element of the sensing circuit (104) may include a pair of electrodes disposed within the microfluidic channel (102). The presence or absence of a particle between the electrodes changes the capacitance of the sensing circuit (104). The change in capacitance also changes the resonant frequency output by the sensing circuit (104). As the contents between the electrodes change, so does the capacitance. That is, different particles, different cells, and/or different quantities of particles and cells may produce a different change to capacitance between electrodes of the sensing circuit (104).

Accordingly, the particle detection system (100) includes a controller (106) to determine the contents of the volume between the electrodes based on the resonant frequency. That is, based on the output resonant frequency, the particle detection system (100) can determine whether a single cell or multiple cells is found between the electrodes and in some cases may be able to determine a type of cell found between the electrodes.

As a specific example, a first cell between the electrodes may result in a first capacitance at the capacitive electrodes which translates to a first resonant frequency of the sensing circuit (104). By comparison, when a different cell, or more cells, are present between the electrodes, a second capacitance is exhibited at the capacitive electrodes. The second capacitance being different than the first capacitance results in a second resonant frequency output that is different than the first resonant frequency. The controller (106) may distinguish between these two resonant frequencies and can map each to a particular particle and/or a quantity of the particular particle that is between the electrodes. As frequency provides a more precise measurement than voltage and is less susceptible to noise, the particle detection system (100) may discriminate particles with higher sensitivity.

The controller (106) may include various hardware components, which may include a processor and memory. The processor may include the hardware architecture to retrieve executable code from the memory and execute the executable code. As specific examples, the controller as described herein may include computer readable storage medium, computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the controller (106) cause the controller (106) to implement at least the functionality of detecting particles via a resonant frequency.

In some examples, the particle detection system (100) may be a component of a larger fluid manipulation system. In this example, the fluid manipulation system may include a fluid ejector to eject the amount of fluid, and corresponding particle, from the reservoir. That is, the particle dispensing system (100) may hold the fluid ejectors above a surface onto which a target particle is to be ejected. As a specific example, the particle dispensing system (100) may form part of a fluid analysis system that includes a stage to hold a well plate. It may be desirable to dispense target particles into individual wells of the well plate. Accordingly, the fluid ejection devices include fluid ejectors that expel the target particles through openings towards the individual wells of the well plate.

The fluid ejector may include a firing resistor or other thermal device, a piezoelectric element, or other mechanism for ejecting particles from the firing chamber. For example, the fluid ejector may be a firing resistor. The firing resistor heats up in response to an applied voltage. As the firing resistor heats up, a portion of the fluid adjacent the firing resistor vaporizes to form a bubble. This bubble pushes the cell to be analyzed out an orifice and onto a surface such as a micro-well plate. As the vaporized fluid bubble collapses, a vacuum pressure along with capillary force draws additional fluid towards the fluid ejector, and the process repeats. In this example, the fluid ejector may be a thermal inkjet fluid ejector.

In another example, the fluid ejector may be a piezoelectric device. As a voltage is applied, the piezoelectric device changes shape which generates a pressure pulse that pushes a fluid out the orifice. In this example, the fluid ejector may be a piezoelectric inkjet fluid ejector.

In this example, the controller (106), responsive to an output of the sensing circuit (104), may control the fluid ejection. For example, when it is determined that a single target particle is present between the electrodes and headed towards the fluid ejector, the controller (106), may activate the fluid ejector and/or may position a substrate under the fluid ejector to capture the target particle. By comparison, when it is determined that more than one target particle, or a particle other than the target particle is present between the electrodes and headed towards the fluid ejector, the controller (106), may de-activate the fluid ejector or position a waste receptacle under the fluid ejector to capture the non-target particle.

In summary, the particle detection system (100) includes a capacitive element where capacitance is modulated by the presence and type of particle. The LC, or sensing circuit (104) is drive to resonance and when the capacitance changes, the sensing circuit (104) resonates at a different frequency. This frequency may be correlated to a particular particle.

Accordingly, the present particle detection system (100) effectively isolates and identifies particles targeted for ejection and analysis, and does so via a mechanism, i.e., resonant frequency detection, that is less susceptible to noise. That is, when measuring a voltage directly, even small amounts of electrical noise may get measured. However, as the particle detection system (100) counts rising edges of a resonant sensing circuit (104), it may take large amounts of electrical noise to make an extra rising/falling edge that would get counted by a frequency counter.

Figure 2A:
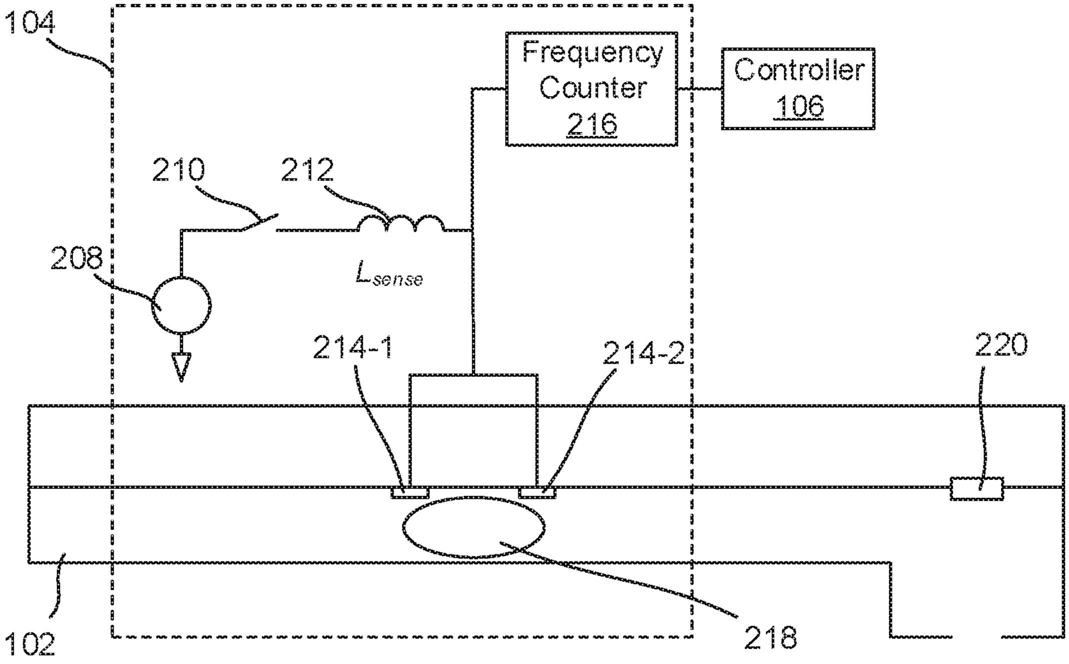
FIGS. 2A and 2B are diagrams of a system for detecting particles via a resonant frequency, according to examples of the principles described herein.
Figure 2B:
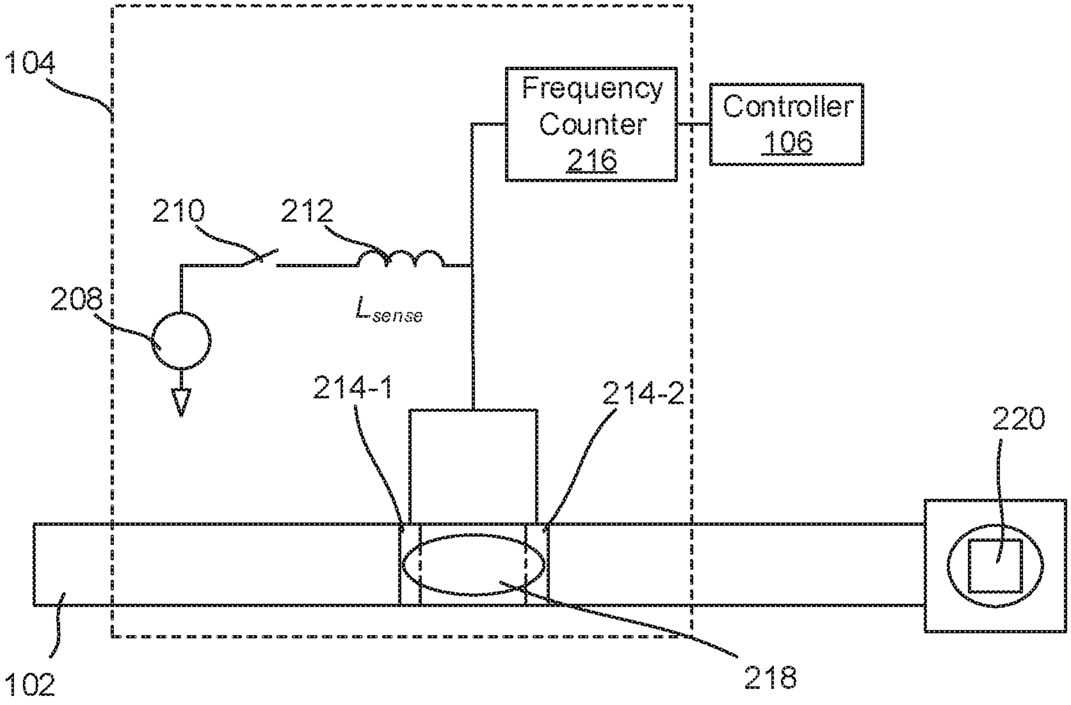

FIGS. 2A and 2B are diagrams of a system for detecting particles (218) via a resonant frequency, according to examples of the principles described herein. Specifically, FIG. 2A is a cross-sectional side view and FIG. 2B is a bottom view of the particle detection system (FIG. 1, 100).

As described above, the particle detection system (FIG. 1, 100) includes a microfluidic channel (102) with electrodes (214-1, 214-2) of a sensing circuit (104) disposed within the microfluidic channel (102). FIG. 2A also depicts an example of the fluid ejector (220) which draws fluid through the microfluidic channel (102). In this example, to eject fluid through the opening, the fluid ejector (220) heats up. As the fluid ejector (220) heats up, a portion of the fluid adjacent the fluid ejector (220) vaporizes to form a bubble. This bubble pushes the cell to be analyzed out an orifice and onto a surface such as a micro-well plate. As the vaporized fluid bubble collapses, a vacuum pressure along with capillary force draws additional fluid towards the fluid ejector (220) through the microfluidic channel (102), and the process repeats.

On its path through the microfluidic channel (102), the particle (218) passes by the electrodes (214-1, 214-2) which have a space between them and thereby form a capacitor of the sensing circuit (104). In this example, the sensing circuit (104) also includes a voltage source (208) to apply a voltage through the sensing circuit (104) and a switch (210) to drive multiple frequencies of the voltage into the sensing circuit (104). In an example, a square wave may be represented as an infinite number of sinusoidal waves. Accordingly, a square wave may contain multiple frequencies. Accordingly, applying a square wave via the switch (210) can be seen as applying multiple sine waves to the sensing circuit (104). As described above, the resonant frequency remains and others die out.

That is, as the switch (210) closes, a pulse is introduced into the sensing circuit (104) that may be modeled as a step function with a finite slew rate, which slew rate introduces various frequencies into the sensing circuit (104) and past the inductor (212) of the sensing circuit (104). In this example, all but the resonant frequency will die out. This resonant, or remaining frequency, will be detected by the frequency counter (216). That is, the frequency counter (216) determines the resonant frequency of the sensing circuit (104). Specifically, the frequency counter (216) may be counting the amount of time between rising and falling edges to calculate the frequency of the sine wave. That frequency is the frequency that the sensing circuit (104) is resonating at.

As described above, the contents of the space between the electrodes (214-1, 214-2) and the resonant frequency are both altered by what is found in the volume between the electrodes (214-1, 214-2) with different particles (218) resulting in different changes to the capacitance/resonant frequency.

The frequency counter (216) may include filters such as a high pass filter, a low pass filter, and a band pass filter. The frequency counter (216) may also include an integrated circuit such as a field-programmable gate array (FPGA), microcontroller, or application-specific integrated circuit (ASIC) to count how often rising edges are seen. In this example, the integrated circuit may sample at a higher frequency than will be measured. For example, the integrated circuit may sample at the Nyquist rate.

In an example, a sine wave goes into the frequency counter (216) which may have a voltage level at which the sine wave looks like a "1," and another voltage level at which the sine wave looks like a "0." Accordingly, the frequency counter (216) may model the sine wave as a square wave representation.

Based on an empirical mapping or calculation, the controller (106) determines the contents of the volume based on the resonant frequency. That is, as described above, a certain resonant frequency may be output from the sensing circuit (104) to the controller (106), and the controller (106) may consult a database with a mapping between resonant frequencies and cell types and quantities. Accordingly, the controller (106) may output which particle (218), and how many particles (218) are between the electrodes (214-1, 214-2) and in some examples may control the fluid ejector (220) and/or other components of the fluid ejection system accordingly.

While FIGS. 2A and 2B specifically depict a switch to introduce the different frequencies, the sensing circuit (104) may include other components to introduce different frequencies. Examples include a pulse generator or a broad band frequency generator.

As described above, frequency detection and counting may be less sensitive to noise than sensing voltages. Therefore, the present particle detection system (FIG. 1, 100) may provide a more accurate and reliable measure of particle (218) type and/or quantity along a microfluidic channel (102).

Figure 3:
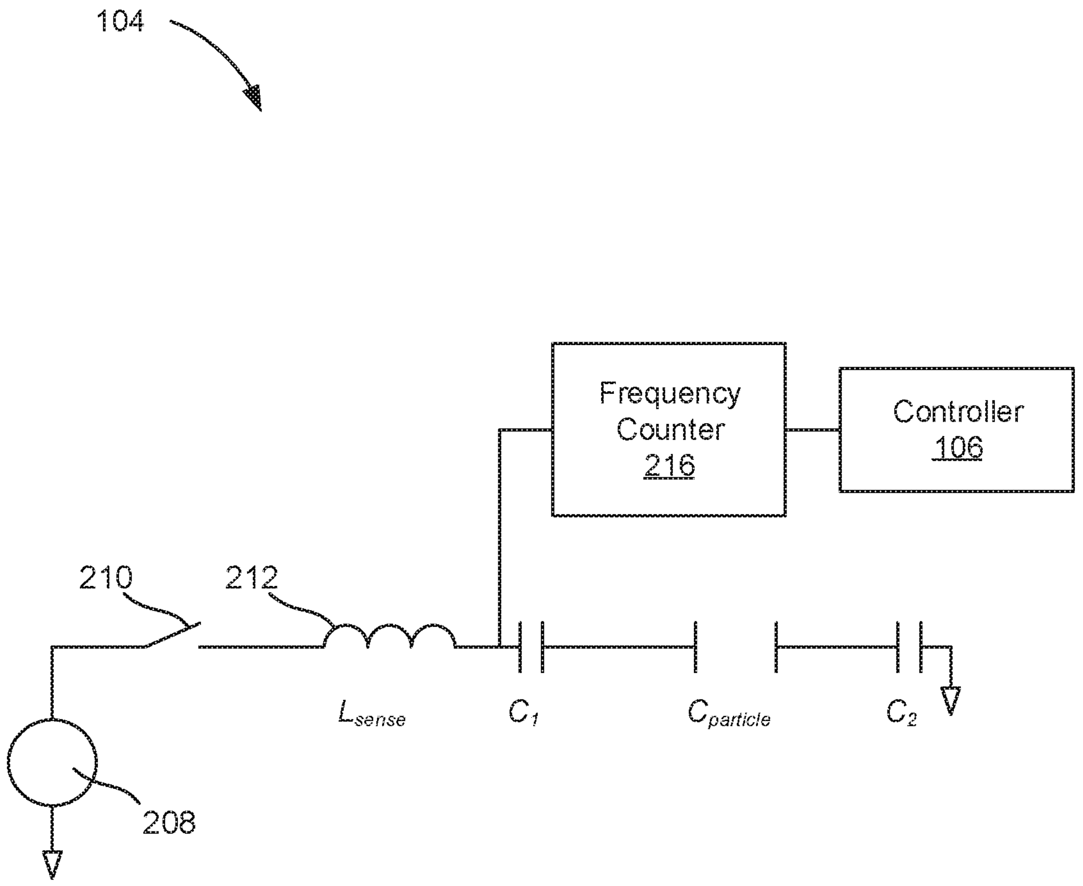
FIG. 3 is a circuit diagram of a sensing circuit for detecting particles via a resonant frequency, according to an example of the principles described herein.

FIG. 3 is a circuit diagram of a sensing circuit (104) for detecting particles via a resonant frequency, according to an example of the principles described herein. FIG. 3 also depicts the controller (106) which determines the particle (FIG. 2A, 218) type and/or quantity based on an output of the sensing circuit (104). As described above, the sensing circuit (104) may be an LC, or resonating circuit, that oscillates at a particular resonant frequency. That is, rather than sensing voltage on a capacitor, the sensing circuit (104) senses capacitances by detection of the resonant frequency of the LC or sensing circuit (104). That is, as described above, as the switch (210) closes, multiple frequencies are introduced into the sensing circuit (104). These frequencies excite the sensing circuit (104) which resonates with some resonance frequency $\omega_0=1/\sqrt{LC}$. As indicated, the inductance, L, of the inductor (212) and the capacitance, C, of the capacitive element determine the resonant frequency, $\omega_0$. The capacitance of the sensing circuit (104) is defined by three components, a capacitance, $C_1$, of the first electrode (FIG. 2A, 214-1), a capacitance, $C_2$, of the second electrode (FIG. 2A, 214-2), and the capacitance, $C_{particle}$, of the cell, or particle (FIG. 2A, 218) between the electrodes (FIG. 2A, 214). As described above, each particle (FIG. 2A, 218) or group of particles has different electrical properties such that the $C_{particle}$ value varies based on what is found between the electrodes (FIG. 2A, 214). Accordingly, as $C_{particle}$ may be different values based on the particle type and/or quantity, the value of the resonant frequency, $\omega_0$, may also change based on the particle type and/or quantity. Accordingly, the frequency counter (216) may detect the resonant frequency of the sensing circuit (104) and pass this value to a controller (106) which determines the particle (FIG. 2A, 218) type and/or quantity based on the detected resonant frequency. Put another way, from the multiple frequencies introduced by the switch (210), the resonant frequency, which is dependent upon the particle (FIG. 2A, 218) presence and capacitance, may persist and is picked up by the frequency counter (216).

Figure 4A:
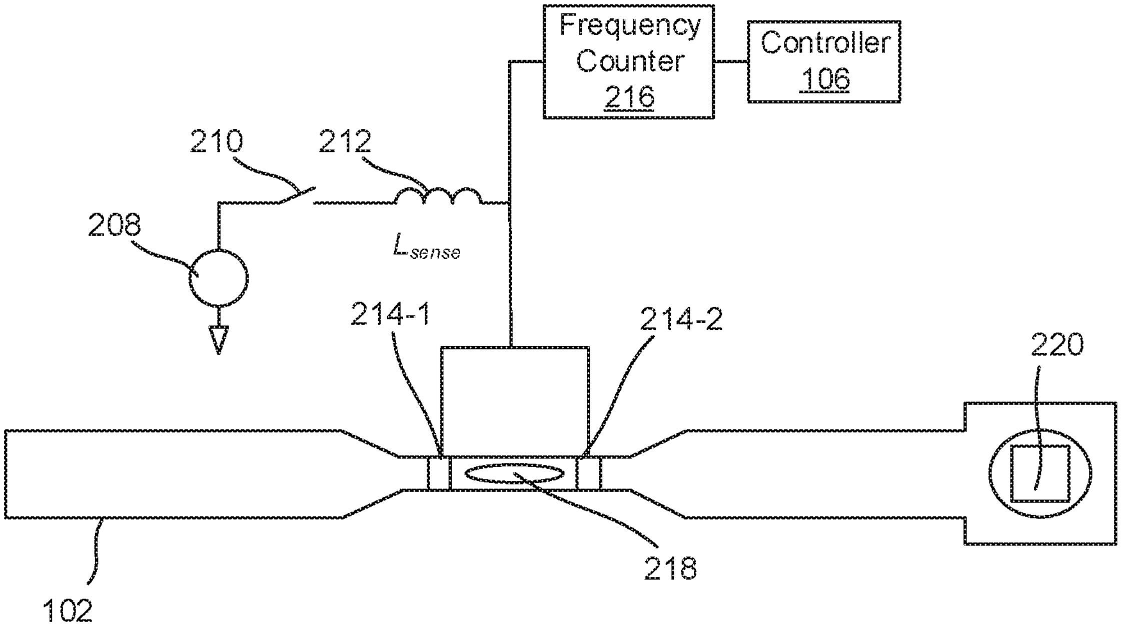
FIGS. 4A and 4B are diagrams of a system for detecting particles via a resonant frequency, according to examples of the principles described herein.
Figure 4B:
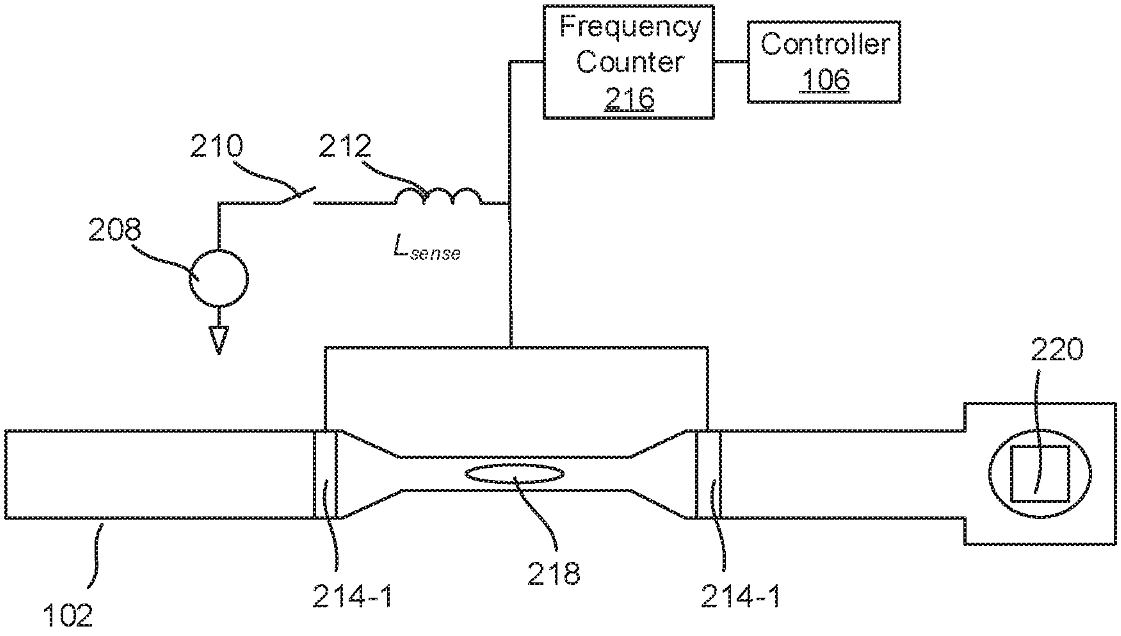

FIGS. 4A and 4B are diagrams of a system for detecting particles (218) via a resonant frequency, according to examples of the principles described herein. In some examples, the structure of the microfluidic channel (102) may take different forms. For example, the microfluidic channel (102) may include a constriction through which the particle (218) passes while being measured. Such a constriction may amplify the resulting capacitance change effectuated when a particle (218) is in between the electrode (214) plates. That is, the electrodes (214-1, 214-2) form a capacitor and the contents between the electrodes (214-1, 214-2) determine the capacitance. It may be desirable for the particle (218) to occupy a greater fraction of the volume to generate a larger difference in capacitance in the absence or presence of the cell. That is, it may be the case that a bigger signal is received when the cell displaces most of the liquid between the two electrodes (214-1, 214-2). Accordingly, a constriction squeezes the cell such that the cell displaces a higher percentage of the liquid.

Accordingly, in one example as depicted in FIG. 4A, the pair of electrodes (214) may be disposed inside of the constriction along the microfluidic channel (102). In another example as depicted in FIG. 4B, the pair of electrodes (214) may be disposed outside of the constriction along the microfluidic channel (102).

Figure 5:
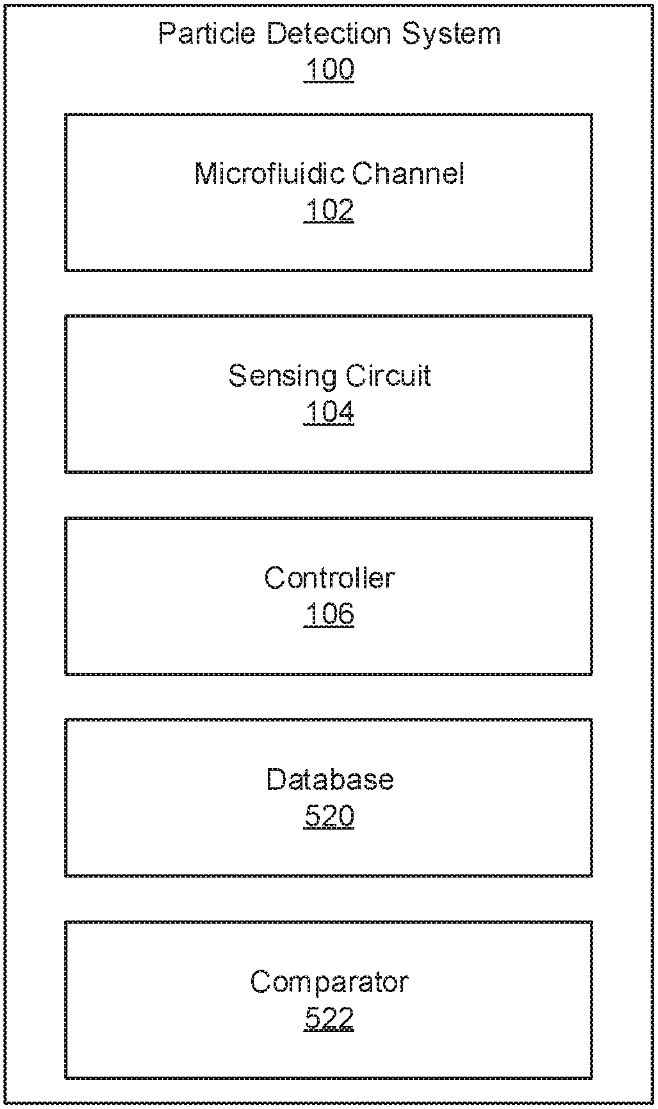
FIG. 5 is a block diagram of a system for detecting particles via a resonant frequency, according to an example of the principles described herein.

FIG. 5 is a block diagram of a system (100) for detecting particles (FIG. 2A, 218) via a resonant frequency, according to an example of the principles described herein. As described above, the particle detection system (100) may include a microfluidic channel (102), a sensing circuit (104) including electrodes (FIG. 2A, 214) in the microfluidic channel (102), and a controller (106). In some examples, the particle detection system (100) may include other components.

For example, the particle detection (100) system may include a database (520) to map resonant frequencies to contents of the volume. That is, as described above, there may be a relationship between the capacitance of the sensing circuit (104) and the contents found in a space between the electrodes (FIG. 2A, 214). Different cells between the electrodes (FIG. 2A, 214) vary the capacitance, with different particles altering the capacitance to different degrees based on the physical properties of the particle (FIG. 2A, 218) and a quantity of particles (FIG. 2A, 218) between the electrodes (FIG. 2A, 214). The change in capacitance effectuated by the particle (FIG. 2A, 214) also changes the resonant frequency of the sensing circuit (104). Accordingly, the database (520) may include a mapping between the resonant frequency and the contents of the volume such that the contents of the volume may be ascertained based on a detected resonant frequency.

As a particular example, the database (520) may map output resonant frequencies with a cell type. Accordingly, the controller (106) may receive an output resonant frequency and extract from the database (520) a cell type associated with that resonant frequency. As another example, the database (520) may map output resonant frequencies to a quantity of cells. Accordingly, the controller (106) may receive an output resonant frequency and extract from the database (520) a quantity of cells associated with that resonant frequency. As yet another example, the database (520) may map output resonant frequencies to a cell type and a cell quantity. Accordingly, the controller (106) may receive an output resonant frequency and extract from the database (520) to identify a cell type associated with that resonant frequency and a quantity of cells present between the electrodes (FIG. 2, 214). In some examples, the database (520) may be indexed via capacitance. That is, the controller (106) may convert the resonant frequency output by the sensing circuit (104) to a capacitance and the database (520) may map capacitance values to the contents of the volume as described above.

In the example depicted in FIG. 5, the particle detection system (100) may also include a comparator (522) to convert the resonant frequency output by the sensing circuit (104) into a step function. The comparator (522) may be a high impedance buffer such as an operational amplifier that isolates the frequency counter (FIG. 2, 216) input from the circuit. Without the comparator (522) it may be that the frequency counter (FIG. 2, 216) input does not have high enough impedance which may affect the measurement.

In some examples, the comparator (522) may convert the sine wave to a square wave, similar to how the frequency counter (FIG. 2, 216) may do so. However, the comparator (522) may have a programmable comparison. That is, a user of the particle detection system (100) may determine at which voltage to have a "1" and a "0" (for example by including particular resistors in the comparator (522).

Figure 6:
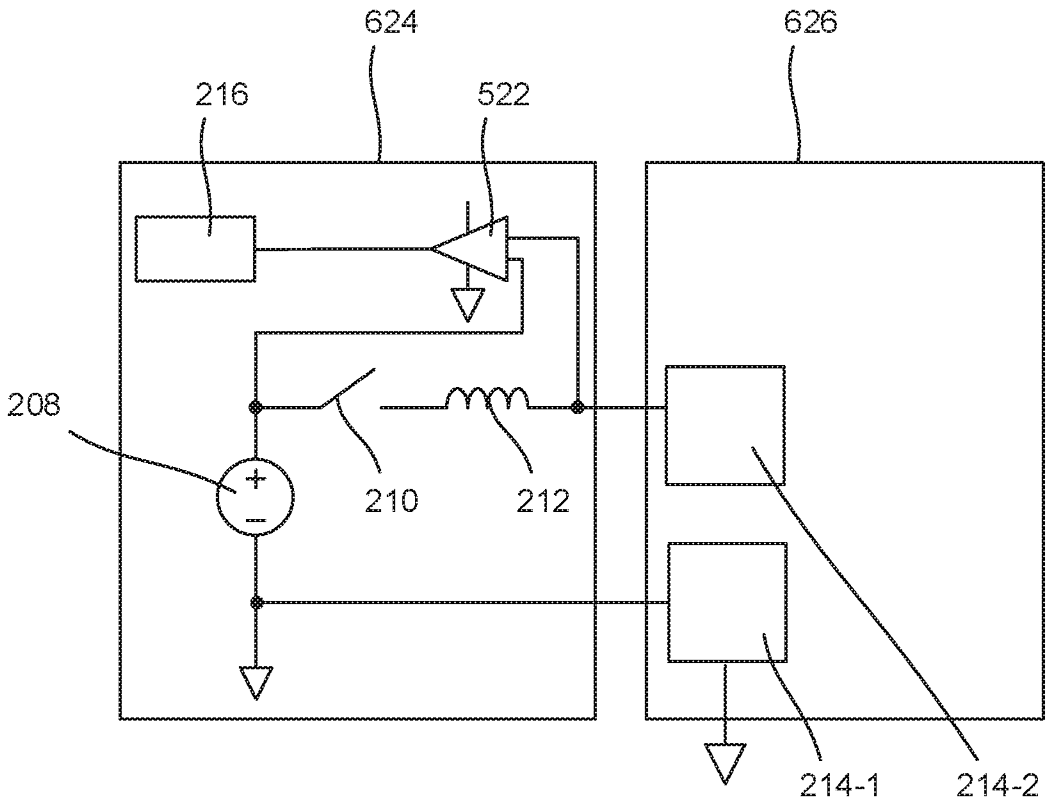
FIG. 6 is a diagram of a system for detecting particles via a resonant frequency, according to an example of the principles described herein.

FIG. 6 is a diagram of a system for detecting particles (FIG. 2A, 218) via a resonant frequency, according to an example of the principles described herein. FIG. 6 clearly depicts previously described components of the particle detection system (FIG. 1, 100). Specifically, FIG. 6 depicts the electrodes (214-1, 214-2), inductor (212), switch (210), voltage supply (208), comparator (522), and frequency counter (216). FIG. 6 also depicts the surfaces on which these components are disposed. That is, as described above, the electrodes (214-1, 214-2) may be formed in the microfluidic channel (FIG. 1, 102) which may be formed on a fluidic die (626). The fluidic die (626) refers to a substrate, such as silicon, which houses the ejection subassemblies, i.e., fluid ejectors (FIG. 2A, 220), ejection chambers, etc. through which fluid flows.

By comparison, other components such as the inductor (212), switch (210), voltage source (208), comparator (522), and frequency counter (216) are outside the microfluidic channel (FIG. 1, 102), and may not even be on the fluidic die (626). That is, as depicted in FIG. 6, these components may be on a different substrate (624) such as a printed circuit board that is contained within a computing device, or elsewhere on the system in which the particle detection system (FIG. 1, 100) is located.

Figure 7:
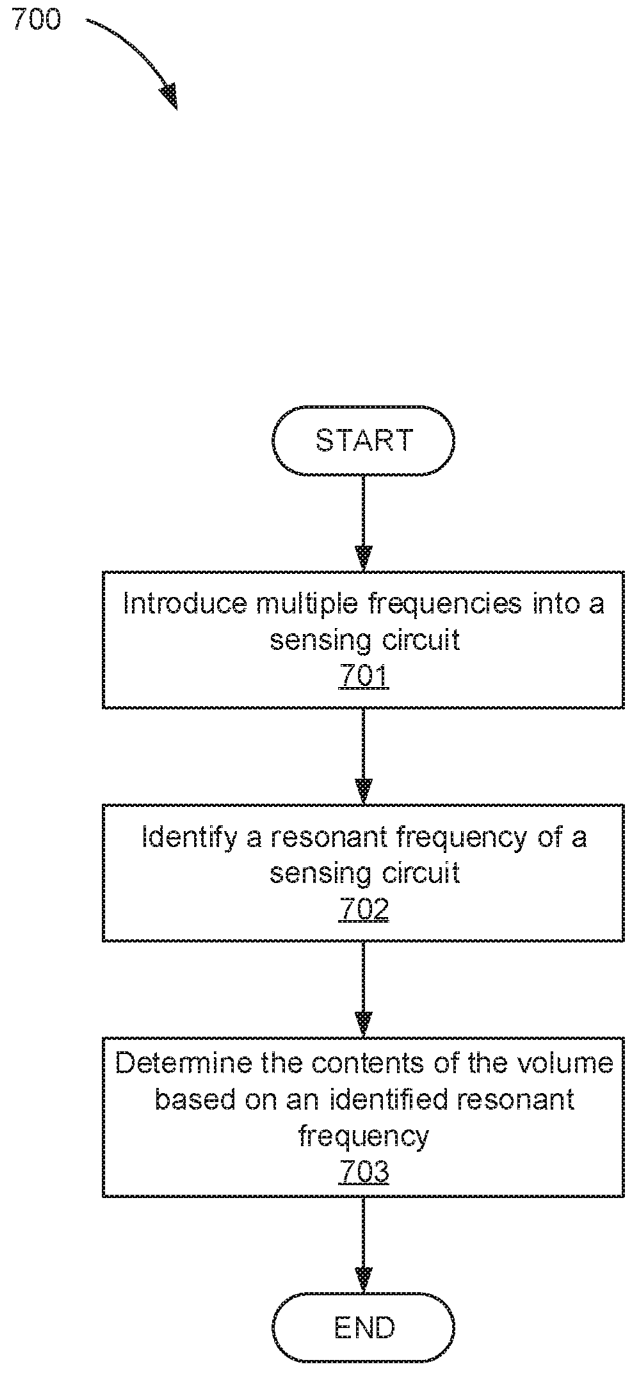
FIG. 7 is a flowchart of a method for detecting particles via a resonant frequency, according to an example of the principles described herein.

FIG. 7 is a flowchart of a method (700) for detecting particles (FIG. 2A, 218) via a resonant frequency, according to an example of the principles described herein. According to the method (700), multiple frequencies are introduced (block 701) into a sensing circuit (FIG. 1, 104). That is, as described above, a voltage source (FIG. 2A, 208) may be coupled to a sensing circuit (FIG. 1, 104) via a switch (FIG. 2A, 210). Closing the switch (FIG. 2A, 210) may generate multiple frequencies across the inductor (FIG. 2A, 212) and the capacitive element of the sensing circuit (FIG. 1, 104). The pair of electrodes (FIG. 2A, 214) disposed in the microfluidic channel (FIG. 1, 102) act as the capacitive element and the capacitance of this capacitive element is defined in part by the particles (FIG. 2A, 218) that are between the electrodes (FIG. 2A, 214) at any given time. Accordingly, as the particles (FIG. 2A, 218) between the electrodes (FIG. 2A, 214) change over time so does the capacitance of the capacitive element and the resonant frequency of the sensing circuit (FIG. 1, 104). Accordingly, the frequency counter (FIG. 2A, 216) identifies (block 702) the resonant frequency of the sensing circuit and the controller (FIG. 1, 106) determines (block 703) the contents of the volume based on an identified resonant frequency. As described, determining (block 703) the contents of the volume may include determining a quantity of particles between the electrodes (FIG. 2A, 214) and/or determining a type of particle between the electrodes (FIG. 2A, 214).

Figure 8:
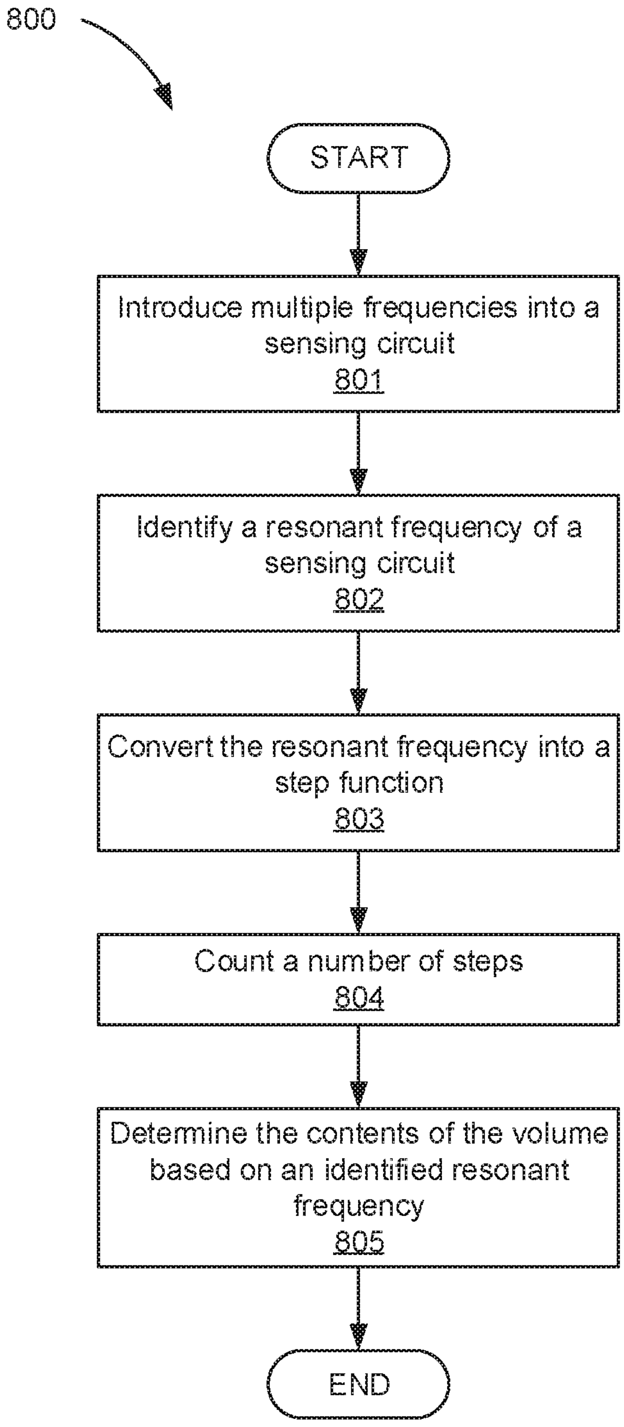
FIG. 8 is a flowchart of a method for detecting particles via a resonant frequency, according to an example of the principles described herein.

FIG. 8 is a flowchart of a method (800) for detecting particles (FIG. 2A, 218) via a resonant frequency, according to an example of the principles described herein. As described above, the method (800) may include introducing (block 801) multiple frequencies into a sensing circuit (FIG. 1, 104) and identifying (block 802) a resonant frequency of the sensing circuit (FIG. 1, 104). These operations may be performed as described above in connection with FIG. 7. In some examples, the method (800) also includes converting (block 803) the resonant frequency into a step function and counting (block 804) the steps. From the count of steps, the controller (FIG. 1, 106) may determine (block 805) the contents of the volume based on the identified resonant frequency. This to may be done as described above in connection with FIG. 7.

In summary, using such a particle detection system 1) provides highly accurate cell separation; 2) is low cost; 3) provides for the rapid generation of many singulated cells; 4) avoids additional labeling reagents; 5) avoids separate verification tools/operations; 6) is less sensitive to stray capacitances in the system; and 7) has a good signal-to-noise ratio. However, the devices disclosed herein may address other matters and deficiencies in a number of technical areas.

What is claimed is:

1. A particle detection system, comprising:

a microfluidic channel through which fluid is to flow, wherein the fluid comprises particles;

a sensing circuit to output a resonant frequency, wherein:

the sensing circuit comprises a pair of electrodes disposed within the microfluidic channel and an inductor outside the microfluidic channel, the pair of electrodes and the inductor forming an LC resonant circuit;

contents of a volume between the pair of electrodes changes a capacitance between the pair of electrodes; and a change in the capacitance between the pair of electrodes changes the resonant frequency output by the sensing circuit;

a frequency counter to detect the resonant frequency of the sensing circuit; and a controller to determine the contents of the volume based on the resonant frequency.

2. The particle detection system of claim 1, further comprising a database to map resonant frequency to contents of the volume.

3. The particle detection system of claim 2, wherein:

the controller is to convert the resonant frequency output by the sensing circuit to a capacitance; and the database is to map the capacitance to contents of the volume.

4. The particle detection system of claim 1, further comprising a comparator to convert the resonant frequency output by the sensing circuit to a step function.

5. The particle detection system of claim 1, wherein the pair of electrodes are disposed inside of a constriction along the microfluidic channel.

6. The particle detection system of claim 1, wherein the pair of electrodes are disposed outside of a constriction along the microfluidic channel.

7. The particle detection system of claim 1, wherein the fluid is drawn through the microfluidic channel via an inkjet ejector.

8. The particle detection system of claim 1, wherein the sensing circuit further comprises a switch to introduce multiple frequencies into the sensing circuit.

9. A method, comprising:

introducing multiple frequencies into a sensing circuit, the sensing circuit comprising a pair of electrodes disposed within a microfluidic channel and an inductor outside the microfluidic channel, the pair of electrodes and the inductor forming an LC resonant circuit, wherein:

a fluid with particles disposed therein flows between the pair of electrodes;

identifying a resonant frequency of the sensing circuit, the resonant frequency defined in part by the capacitance of a volume between the pair of electrodes; and determining the contents of the volume based on an identified resonant frequency.

10. The method of claim 9, wherein introducing multiple frequencies comprises closing a switch to couple a voltage source to the sensing circuit.

11. The method of claim 9, further comprising:

converting the resonant frequency into a step function; and counting a number of steps.

12. The method of claim 9, wherein determining the contents of the volume comprises determining a quantity of particles within the volume.

13. The method of claim 9, wherein determining the contents of the volume comprises determining a type of particle within the volume.

14. A particle detection system, comprising:

a microfluidic channel through which fluid is to flow, wherein the fluid comprises particles;

a sensing circuit to output a resonant frequency, the sensing circuit comprising:

a pair of electrodes disposed within the microfluidic channel;

a voltage source to apply a voltage through the sensing circuit;

a switch to drive multiple frequencies of the voltage into the sensing circuit;

an inductor, the pair of electrodes and the inductor forming an LC resonant circuit; and a frequency counter to determine the resonant frequency of the sensing circuit, wherein:

contents of a volume between the pair of electrodes changes a capacitance between the pair of electrodes; and a change in the capacitance changes the resonant frequency output by the sensing circuit; and a controller to determine the contents of the volume based on the resonant frequency.

15. The particle detection system of claim 14, wherein the controller, responsive to an output of the sensing circuit, is to control a fluid ejection system in which the particle detection system is disposed.

* * * * *